United States Patent [19]
Thiessen et al.

[11] 3,977,705
[45] Aug. 31, 1976

[54] REDUCING TYPE COUPLING

[75] Inventors: Leo K. Thiessen, Shawnee Mission, Kans.; Conrad B. Smith, Houston, Tex.

[73] Assignee: Aeroquip Corporation, Jackson, Mich.

[22] Filed: Aug. 20, 1975

[21] Appl. No.: 606,124

[52] U.S. Cl. ............................................ 285/112
[51] Int. Cl.² ........................................ F16L 17/00
[58] Field of Search ........... 285/112, 177, 104, 367, 285/369, 383, 101, 45–50

[56] References Cited
UNITED STATES PATENTS

| | | | |
|---|---|---|---|
| 3,298,698 | 1/1967 | Condon | 285/177 X |
| 3,680,894 | 8/1972 | Young | 285/112 |
| 3,695,638 | 10/1972 | Blakely | 285/112 |

*Primary Examiner*—G. V. Larkin
*Attorney, Agent, or Firm*—Thomas M. Scofield

[57] ABSTRACT

A coupling assembly to connect and seal the joint between the ends of axially aligned pipe sections of differing outer diameters; A gasket for sealing against and around the juxtaposed ends of axially aligned pipe sections of differing outer diameters; Coupling housing segments adapted to contain such a gasket radially and axially while engaging with the ends thereof grooves in the outer surfaces of the pipe section ends being coupled and connected.

20 Claims, 11 Drawing Figures

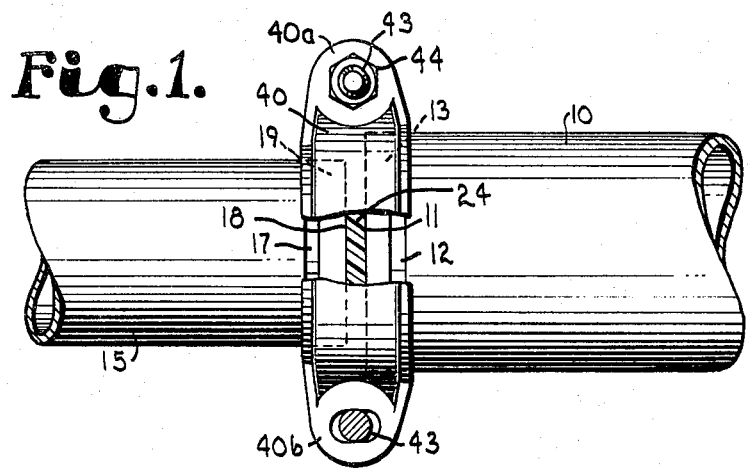
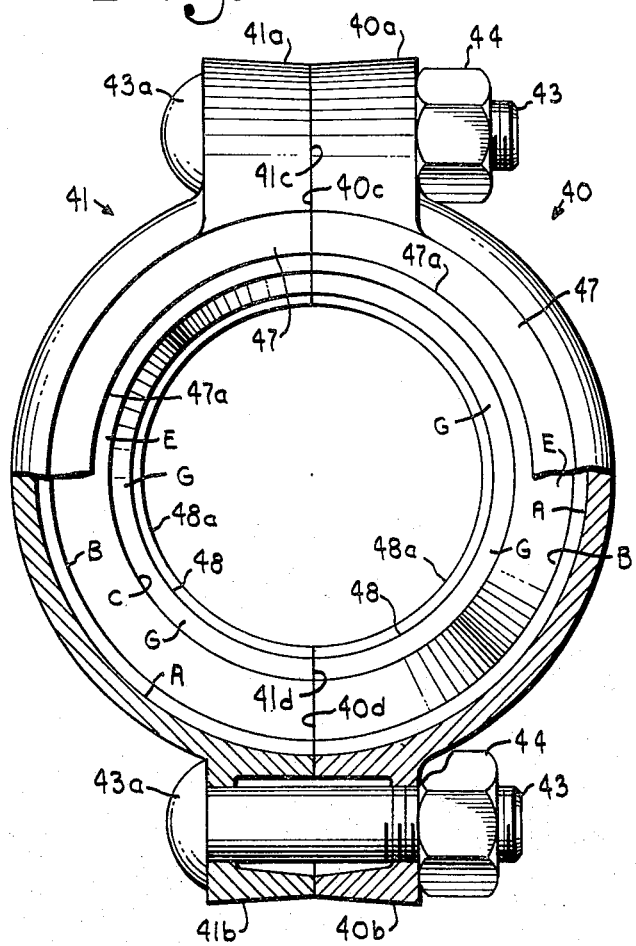
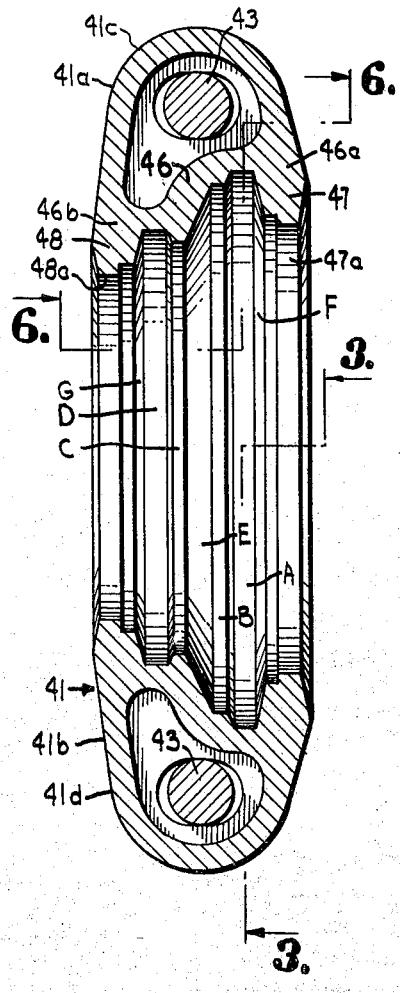

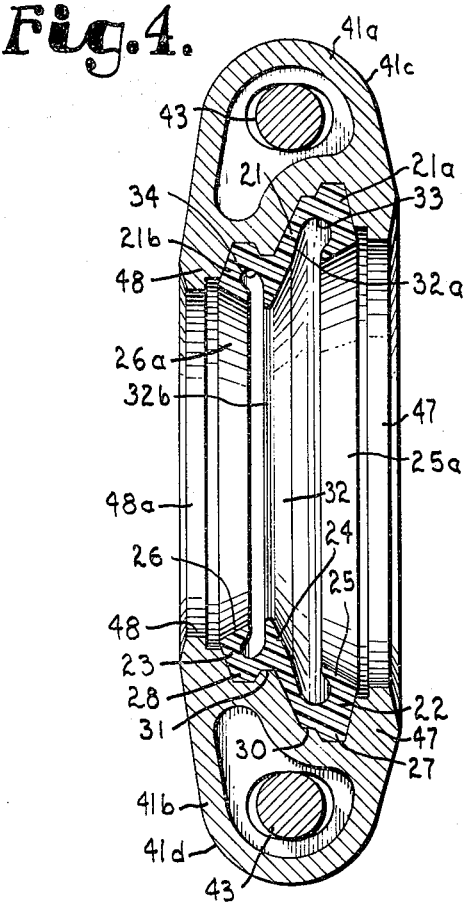
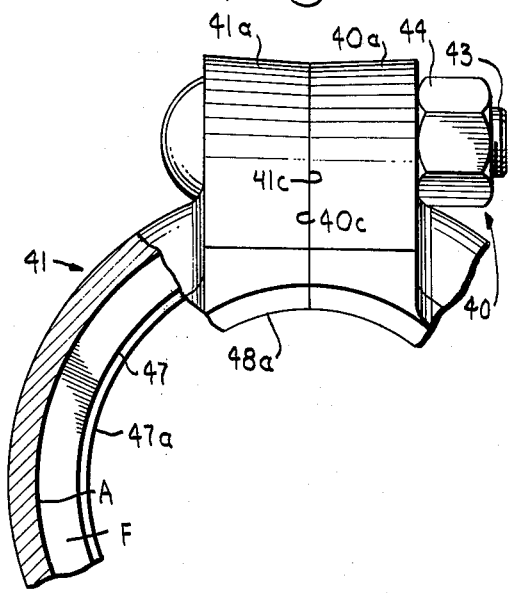
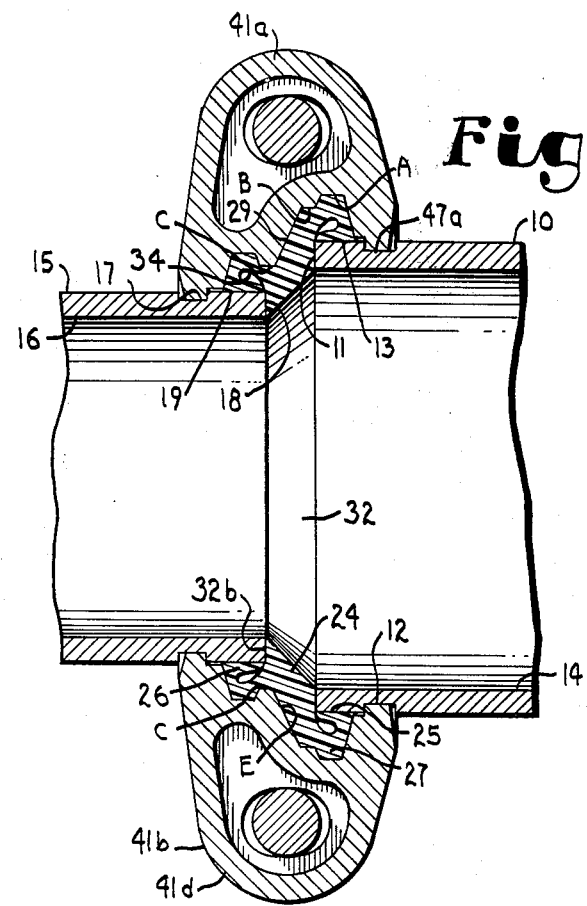
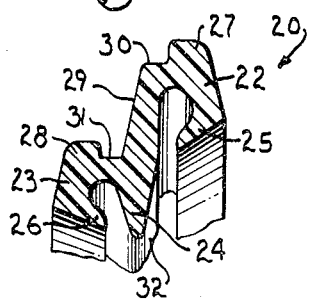

REDUCING TYPE COUPLING

BACKGROUND OF THE INVENTION

Pipe couplings which connect the ends of pipe segments of like outer diameter are well known to the art. A typical form thereof involves half cylinder housings having laterally disposed key sections for engaging grooves formed in the outer surfaces of the pipe segments, with pressure-responsive gaskets received interiorly of the coupling housing segments having inboard portions thereof overlying and in contact with the pipe end outer surfaces. One form of such pipe coupling is seen in the patent to Damsel U.S. Pat No. 2,362,454 issued Nov. 14, 1944 for "Pipe Coupling". Alternatively, when it is not desired to groove the surfaces of the pipe segments being connected, a pipe coupling employing gripping elements may be employed as seen in the patent to Stephens U.S. Pat. No. 2,005,056, issued June 18, 1935 for "Pipe Coupling".

The instant invention is directed to reducing pipe couplings, where a single coupling joins two axially aligned pipe segments at the ends thereof, the segments being of different outer diameter. Conventionally, such a connection is made through two regular couplings and a reducing fitting. Not only is such conventional means complicated and expensive, the application thereof is time consuming. Threaded adaptors and flange connections between pipes of different diameter have also been used. These constructions typically produce a rigid joint and are also time consuming and expensive to employ.

THE PRIOR ART

Applicant is aware of three patents directed to structures and apparatus for coupling together pipe of different outer diameters with a single coupling and a single gasket. These patents are as follows:

Swedish Pat. No. 207,900 of October, 1966;
British Pat. No. 323,252 of December, 1929; and
U.S. Pat. No. 3,680,894, John S. Young, issued Aug. 1, 1972 for "Joints Between Pipes . . . and Couplings and Gaskets for the Same".

SUMMARY OF THE INVENTION

The subject reducing type mechanical pipe joint or coupling operates to provide means for connecting together the ends of pipes of different diameters, once standard grooves are formed in the exterior surfaces of the adjacent pipe ends. The resultant mechanical pipe joint is effectively pressure resistant. In this connection, the pipe ends are normally spaced apart, axially, a short distance. A leak-proof joint is provided which also restrains the pipe ends from moving apart.

The apparatus involved comprises two segmented and symmetrical housing castings and a resilient gasket. The housings position and contain the gasket, while providing end restraint. Integrally formed within the housing are specific and special means operating to correctly hold the gasket in position.

The gasket has externally circumferential ribs located on each side of the gasket, to match with and be contained by matching grooves within the coupling housing. The gasket further has cylindrical surfaces which additionally aid in locating the gasket, further providing containment means while the sealing lip is compressed. The gasket has a frusto-conical transition section between the two external cylindrical surfaces which transits from the larger diameter portion of the gasket to the smaller diameter portion. Finally, the gasket has an internal rib with a frusto-conical transition section extending between the large pipe internal diameter to the small pipe internal diameter. This internal rib has a feature of aiding in installing the gasket by tending to prevent the smaller pipe from sliding into the larger pipe. Further, this internal rib functions as a barrier when the pipe assembly is in the reducing mode by preventing the fluid media from impinging against the sealing lip edge.

While the subject reducing-type mechanical pipe joint and coupling is not satisfactory for connecting pipe ends that differ greatly in diameter, nevertheless, within a considerable pipe diameter difference range, there is provided a fully effective, simple, relatively economical, easily applied and removed connection.

OBJECTS OF THE INVENTION

An object of the invention is to provide a new, improved, reducing type coupling which will join two pipe ends of different diameters in such manner as to provide a leakproof joint and also restrain the pipe ends from moving apart or from moving together and allowing the smaller pipe to telescope into the larger pipe.

Another object of the invention is to provide such an improved reducing type coupling employing two segmental and symmetrical housing castings and a resilient gasket wherein the housings position and contain the gasket while providing end restraint. In addition, the housing has specific and special means to correctly hold the gasket in position when applied.

Another object of the invention is to provide such an improved reducing-type coupling to join two pipe ends of different diameters which is so designed as to have more than one outside diameter on the gasket, the improved subject gasket having externally circumferential ribs, located on each side of the gasket, to match with, and be contained by, matching grooves within the coupling housing. Further, the gasket has a transition section between the two external ribs changing from the larger diameter to the smaller.

Another object of the invention is to provide an improved, reducing-type coupling operable to join two pipe ends of different diameters which is an improvement over the couplings and gaskets seen in the patent to John S. Young, U.S. Pat. No. 3,680,894, issued Aug. 1, 1972 for "Joints Between Pipes of Different Diameters and Couplings and Gaskets for the Same".

Another object of the invention is to provide such an improved reducing-type coupling operable to join two pipe ends of different diameters, which coupling, in the construction of the housing castings and resilient gasket used therewith, obviates any possibility of the gasket collapsing upon itself in use, thus providing, at all times, the desirable compression of the gasket.

Another object of the invention is to provide such a mechanical pipe joint of the reducing-type which may be used with steel, aluminum and plastic pipe.

Still other objects of the invention are to provide matching and cooperating coupling housings and gaskets particularly utilizing and providing the following features, described in terms of structure and function of the gasket:

a. The gasket has externally circumferential ribs located on each side of the gasket, to match with and be contained by, matching grooves within the coupling housing;

b. The gasket further has cylindrical surfaces further aiding in locating the gasket within the coupling and providing containment means while the sealing lip of the gasket is compressed between the coupling and the pipes;

c. The gasket further has a transition section between the two external cylindrical surfaces transiting from the larger diameter portions of the gasket (and housings) to the smaller diameter; and d. The gasket has an internal rib providing a transition section between the large pipe internal diameter to the small pipe internal diameter, said rib having the function of aiding in installing the gasket by tending to prevent the smaller pipe from sliding into the larger pipe, further functioning as a barrier when the pipe assembly is in the reducing mode by preventing the fluid media from impinging against the sealing lip edge.

Another object of the invention is to provide a mechanical pipe joint of the reducing type (reducing type coupling operative to join two pipe ends of different diameters) wherein special reinforcing means are not required within the gasket, in operation, either in the form of reinforcing webs extending across the gasket in the axial direction of the pipes being connected, or reinforcing additive metal or plastic discs internally positioned of the gasket in use, or both of these in combination. Said otherwise, the instant coupling-gasket improvement provides a cooperating, integrated, self-engaging and reinforcing complex which, by itself, achieves all of the desired objects and goals of a reducing type coupling or mechanical pipe joint.

Still other objects of the invention are to provide such reducing-type mechanical pipe joints and couplings which will satisfactorily hold, over long periods of time, their rated working pressure and, additionally, are both easy to apply and remove.

Other objects of the invention will appear in the course of the following description thereof.

In the drawings, which form a part of the instant specification and are to be read in conjunction therewith, an embodiment of the instant improvement is shown and, in the various views, like numerals are employed to indicate like parts.

FIG. 1 is a plan view showing two sections of pipe of different diameters coupled together, in longitudinal alignment, by the improved coupling means of the subject invention. In the view, parts are cut away to better illustrate the position of the pipes and portions of the coupling housing and gasket.

FIG. 2 is an interior, plan view of a half-cylinder coupling housing element constructed according to the instant improvement.

The upper portion of FIG. 3 is an end view of two coupling housing halves like that of FIG. 2 joined together (without the improved gasket positioned therewithin). This view is taken from the righthand side of FIG. 1 looking to the left so that the viewer is looking into the large diameter engaging side of the coupling housing halves towards the smaller diameter engaging side thereof.) The lower portion of FIG. 3 is a view taken along the line 3—3 of FIG. 2 in the direction of the arrows.

FIG. 4 is a view like that of FIG. 2 (interior elevational view of a half cylinder coupling housing element) but with the improved gasket shown mounted therewithin, same cut in section where the gasket departs from the coupling housing half.

FIG. 5 is a horizontal enlarged section through the center of the joint of FIG. 1. (This is a view like that of FIG. 4, but with the two pipe ends engaged by the coupling in grooves in same and the gasket engaged with and sealing against the juxtaposed, axially aligned pipe ends of different diameter.)

FIG. 6 is a view taken along the lines 6—6 of FIG. 2 in the direction of the arrows in the upper portion thereof. The upper portion of the view is like the upper portion of FIG. 3 but looking in the opposite direction.

FIG. 7 is a view taken in axial cross-section showing the gasket prior to mounting in the coupling.

Figure 8:
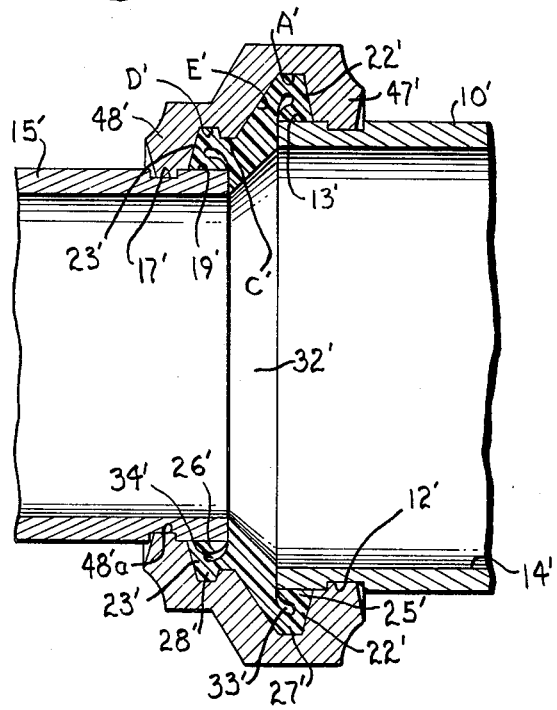

FIG. 8 is a horizontal enlarged section through the center of a pipe joint analogous to the view of FIG. 5 showing a first modification of the improved coupling assembly. (The elements of this coupling assembly (gasket and coupling housing segments adapted to contain same) differ from those of the preceding figures in that one cylindrical surface provided on the periphery of the gasket of FIGS. 1–7, inclusive and interior configuration of the coupling segments relating to the largest outer diameter portion of the gasket and coupling housing segments is omitted.)

Figure 9:
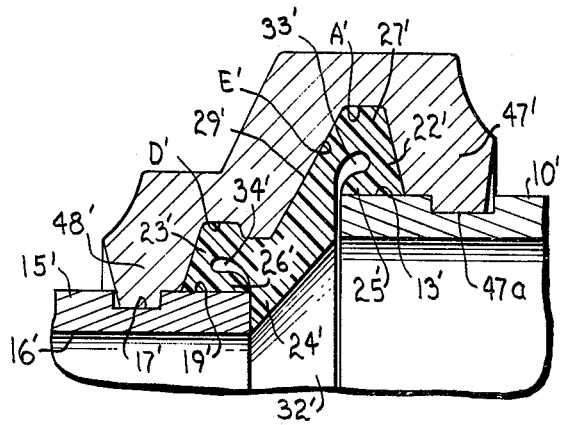

FIG. 9 is an enlarged fragmentary section of one side of the pipe of FIG. 8 detailing the structure of the coupling housing segment and gasket of this first modification.

Figure 10:
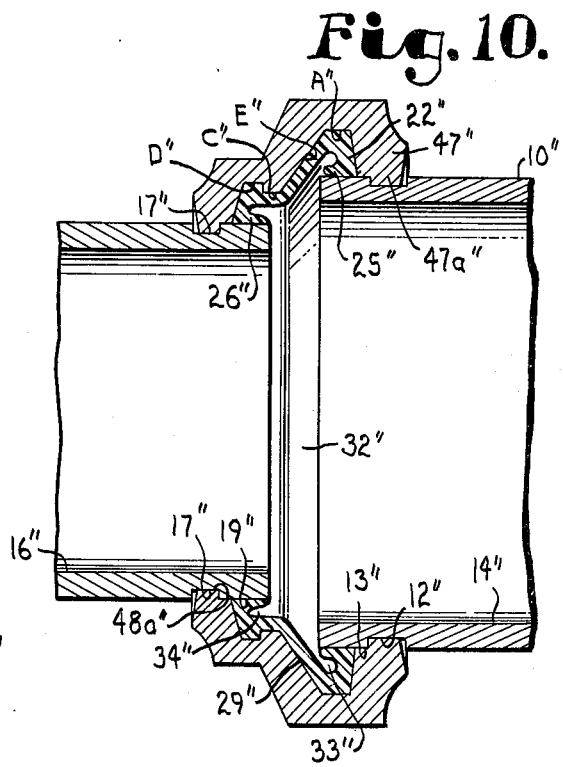

FIG. 10 is a horizontal enlarged section through the center of another pipe joint showing a second modification of the subject coupling assembly involving modifications in the coupling housing segments and gasket associated therewith. This is a view like those of FIGS. 5 and 8.

Figure 11:
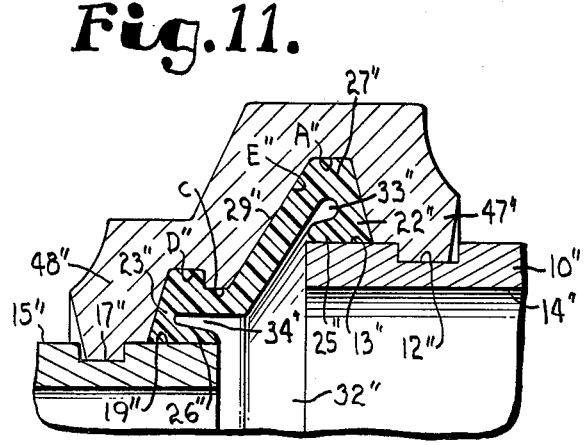

FIG. 11 is an enlarged fragmentary sectional view of one side of the pipe and view of FIG. 10 detailing the construction of the pipe end connection, the coupling housing section and gasket section. (The structural difference of this modification involves omission of the same cylindrical surface as in the structure of FIGS. 8 and 9 and, further, the omission of the internal rib present in the other modifications of the subject gasket.)

Referring to the drawings, and particularly FIGS. 1 and 5, therein is seen the basic nature of the connection or coupling which is desired to be made. This is a connection or coupling between pipe of different outer diameters, one of the pipe segments of greater outer diameter, the other of lesser outer diameter. The pipe need not be of equal wall thickness. In the views, the larger diameter pipe is generally designated 10, having free end edge or surface 11 and a groove 12 formed in the outer surface thereof adjacent the free end 11. Groove 12 is formed by any conventional groove cutting means or device. Between groove 12 and end 11, the outer periphery of the pipe 10 provides surface 13 which is to be engaged by the gasket as will be described. The inner surface or bore of the pipe 10 is numbered 14.

Smaller outer diameter pipe 15 has inner surface or wall 16 and groove 17 formed therein adjacent to but spaced away from end surface or edge 18, thereby providing gasket receiving surface 19. There are industry standards for grooving dimensions, that is, the width and depth of the groove and the spacing thereof from the end of the pipe. Reference here is made to the piping product specifications of the Aeroquip Corporation, Gustin-Bacon Division of Lawrence, Kansas which provides tables of specifications as follows:

Table I — Standard (cut) grooving specification;
Table II — Standard roll grooving specification;
Table III — "EP" cut grooving specification;
Table IV — "EP" roll grooving specification; and
Table V — Rubber lined pipe grooving specification.
"EP" indicates end protection and is intended for use with special gaskets. The instant coupling assembly, both coupling housings and gaskets, is intended to be used with grooving in accordance with industry standards, of which the above are merely one set of specific examples.

The gasket which is to be used to seal the pipe ends of pipes 10 and 15, within the coupling to be described, is particularly seen in FIGS. 4, 5 and 7. FIG. 7 is a sectional view taken in axial cross-section showing the gasket prior to mounting in the coupling. FIG. 4 is a view into one-half of the coupling with the gasket sectioned where it exits the particular coupling segment. FIG. 5 is a view like that of FIG. 4 but with the gasket received in the coupling and sealing externally of the pipe ends and internally between the ends thereof.

Gasket 20 (generally designated) is a circular member, short in length and substantially frusto-conical in axial cross-section. However, the gasket, in said axial cross-section, as may be seen from FIGS. 4, 5 and 7, is complexly configured to fit over the pipe ends to be coupled and between said ends. The gasket member has a base portion 21 with two end portions 22 and 23 extending radially inwardly therefrom at the longitudinal ends 21a and 21b thereof, respectively. A radially inwardly extending internal rib 24 is connected to and extends from said base portion 21, substantially centrally thereof and intermediate the end portions thereof. The said end portions 22 and 23 terminate inwardly or inboard in opposing, laterally extending lips 25 and 26, the inboardmost surfaces thereof 25a and 26a serving to overlie and seal against the pipe peripheral surfaces 13 and 19 when the gasket and coupling are applied to the pipe.

The gasket additionally has two external, circumferential ribs 27 and 28 positioned substantially at the longitudinal ends thereof and extending radially outwardly from said base portion 21. Specifically, ribs 27 and 28 extend outwardly from the base portion ends 21a and 21b, respectively. The outboard surface of the central portion of body portion 21 comprises an external, substantially frusto-conical transition section 29 extending between the two ribs 27 and 28. Preferably there are further provided two circumferential, substantially cylindrical portions 30 and 31, one on each end or side of the transition section 29, each of said cylindrical portions 30 and 31 being of lesser outer diameter than the outer diameter of the external rib (27 and 28, respectively) next thereto.

Finally, the internal rib 24 is so configured so as to provide a substantially frusto-conical, inboard, transition section 32 extending between the portion 33 of the gasket adapted to receive therewithin the larger pipe and the portion 34 of the gasket adapted to receive the smaller pipe. The end 32a of transition section 32 (and rib 24) is adapted to overlie and contact the free end of large pipe 10. The end 32b of plane 32 and rib 24 is adapted to overlie and contact the free end of lesser outer diameter pipe 15.

Gasket 20 is typically formed of elastomeric material such as a suitable synthetic rubber.

Turning to the housing containing the gasket on the pipe, the total enclosure or coupling housing is typically of metal and typically made up of two segments of a cylinder, each 180° in arcuate extent. FIG. 3 shows two such segments, generally designated 40 and 41, having end lugs 40a and 40b and 41a and 41b perforated as seen in the lower portion of FIG. 3 for engagement by bolts 43 having nuts 44 threadably engaged with the externally threaded ends thereof opposite from the ends 43a having enlarged heads. The manner of connection of the faces of the coupling housings to one another at the bolt receiving ears is done in any conventional manner sufficient or adequate to insure that, when the housing halves are bolted together, face to face, they are aligned to provide a continuous, configured inner surface without interruptions and, additionally, the facing edges of the coupling halves 40 and 41, as seen at 40c, 41c, 40d and 41d are substantially together as the clamping is completed by the tightening of the nuts 44 on bolts 43.

Looking at the end faces of a coupling segment as seen in FIGS. 2, 4 and 5, the coupling housings have a substantially frusto-conical base portion 46 with ends 46a (larger diameter) and 46b (lesser diameter) with radially inwardly extending rims 47 and 48 at the ends thereof. Rims 47 and 48 and the configured interior of base portion 46 form together a gasket receiving and retaining channel. Rims 47 and 48 preferably have substantially equal radial inward extensions, thereby to provide a larger diameter opening in the one side of the completed coupling and a lesser diameter opening into the other. The inwardmost extending portions 47a and 48a of the end rims 47 and 48, respectively, are formed so as to provide key sections adapted to engage (FIG. 5) grooves 12 and 17 formed in the outer surfaces 10 and 15 of the pipe ends to be joined.

The configured interior of the gasket receiving and retaining channels in the inboard faces of the coupling housings is substantially congruent to the outboard face and portions of the ends of the said gasket. Thus, the recess A receives rib 27, surface B abuts the outboard face of section 30, rib C abuts the outboard face of section 31 and groove or recess D receives rib 28. The outboard face of transition section 29 is abutted by angled face E. The angled faces F and G (angled from radial) receive and contain the end faces of ribs 27 and 28, respectively and legs 22 and 23, respectively.

The instant coupling thus comprises two segmental and symmetrical housing castings and a resilient gasket. The housings position and contain the gasket while providing end restraint therefor. The housing and the gasket are so internally and externally configured, respectively, that the gasket is correctly held in position on the pipe and within the housings. The gasket 20 has externally circumferential ribs 27 and 28 located adjacent each end or side of the gasket which match with and are contained by matching grooves A and D within the arcuate, yet frusto-conical housing. The gasket further has circumferential sections 30 and 31 lying against and abutted by surface B and rib C within the coupling housings, further aiding in locating the gasket and providing containment means while the sealing lips 25a and 26a (surfaces of lips 25 and 26) are compressed against the peripheral surfaces 13 and 19 of pipes 10 and 15. Gasket 20 additionally has the transition plane or surface 29 overlaid by and abutted against surface E positioned between ribs 27 and 28 and cylindrical surfaces 30 and 31 which changes from the larger diameter portion of the gasket to the smaller. The internal rib 24 provides a transition surface 32 defining the reduction or enlargement of the passageway between the internal bores of the pipes, changing from the large pipe internal diameter to the small pipe internal diameter. The end walls or surfaces 32a and 32b of this transition surface and the said rib 24 operate to abut against the pipe end edges or wall surfaces and function as a barrier when the pipe assembly is in the reducing mode by preventing the fluid media from impinging against the sealing lip edges.

In application of the gasket and encircling housings to a joint between adjacent pipe sections of differing outer diameter as seen in FIG. 5, the pipe ends are brought closely together and into axial alignment, each pipe being slipped into its respective end of the gasket 20 as this is done. There is inward radial compression from the end portions or legs 22 and 23 on the pipe end portions 13 and 19 once the gasket is fitted thereover. The pipes are preferably brought so closely together (FIG. 5) that the ends 11 and 18 thereof abut against the faces 32a and 32b of rib 24. Thereafter, the coupling housing segments, typically two in number, are fitted over the gaskets with the key sections 47a and 48a fitting into the already formed grooves 12 and 17 in the pipes 10 and 15. Once the housing segments are engaged in the grooves and over the gaskets, the holes in the bolt receiving ears are aligned, with the bolts 43 inserted therethrough and nuts 44 threaded on. The nuts thereafter are tightened down to full enclosure engagement of the gasket within the aligned, key engaged housing segments.

With respect to the sealing of the pipe connection, affected, in combination, by the gaskets and coupling housing segments when both are applied to the juxtaposed pipe ends, as in FIGS. 1 and 5, the following considerations apply. Basically, there are three seal effects. First, there is the initial application sealing of the gasket on each pipe end as the gasket is stretched over and fits onto the juxtaposed ends of the pipes. Secondly, when the coupling housing segments are applied, they compress down (radially) onto the outer faces of the gasket and force leg seals at 13 and 19 (members 25 and 26 in FIG. 5). Finally, in use, with internal pressure into cavities 33 and 34, the gasket is self-energizing to effect the seal at 13 and 19. The entire function of the leg 24 lies in its tendency to prevent telescoping of the smaller outer diameter pipe into the larger outer diameter pipe. Further, the flap or internal rib 24 improves liquid flow from the larger diameter pipe into the smaller diameter pipe by affording less turbulence. The gasket is not compressed inwardly (axially) at its ends on the end surfaces of legs 22 and 23.

Referring to FIG. 5 (also FIG. 1) with respect to the spacing of the pipe ends with respect to one another, the following is noted. Thus, said spacing is determined by the positioning of the grooves 12 and 17 with respect to the pipe ends 11 and 18, respectively. The pipe must be grooved to enable seals at zones 13 and 19 thereon. Here, again, conformance with industry standards is preferred.

With respect to the coupling-gasket assemblies of this disclosure and specification, while the two pipes (of differing outside diameter) often will be of the same thickness of wall, such is not necessarily the case for the coupling-gasket assemblies to work efficiently.

In the FIGS. 1–6, inclusive, the inside faces of the two coupling housings are numbered and lettered the same.

FIGS. 8 & 9

The elements of the coupling assembly (gasket and coupling housing segments adapted to contain same) of FIGS. 8 and 9 differ from those of the preceding figures only in that the one cylindrical surface 30 between rib 27 and transition surface 29 is omitted. Specifically, the rib 27 is enlarged so that its inboard face is a continuation of the transition plane or surface 29. With respect to the coupling housing, this means that surface B is not present and recess A is enlarged so that its inboard face is a continuation of angled face E.

Functionally, this omission is tolerable because, while the presence of the cylindrical surface 30 (and surface B of the housing) aids in keeping the compression load over leg 22, it is not required to confine the gasket. On the other hand, the cylindrical surface 31 (and rib C) are required in order to confine the gasket with respect to the housing.

Thus, in this modification, the cylindrical surface 30 of the gasket and the surface B of the housing, adjacent to the gasket ridge 27 (received in well A of the housing) on the outside of the large end of the gasket (and with respect to the greatest internal diameter portion of the coupling housing) has been omitted. Consequently, the frusto-conical transition surface 29 (and angled surface E) on the outside of the gasket (and interior of the housing) extend directly from the ridge on the large end of the gasket 27'. Accordingly, like parts between the coupling housings, gaskets and pipe members of the views are numbered the same, but primed, in FIGS. 8 and 9.

FIGS. 10 & 11

FIGS. 10 and 11 show the same coupling housing-gasket construction as is seen in FIGS. 8 and 9, differing therefrom in that the radially inwardly extending internal rib 24' thereof is omitted. Accordingly, like parts of the pipe members, gasket and coupling housings of FIGS. 10 and 11 to those of the previous figures are numbered the same, but double primed.

As was previously mentioned with respect to the coupling-gasket assemblies of FIGS. 1–7, inclusive, one function of leg 24 lies in its tendency to prevent telescoping of the smaller diameter pipe into the larger outer diameter pipe. Further, internal rib 24 improves liquid flow from the larger diameter pipe into the smaller diameter pipe by affording less turbulence. These advantages are lost in this form, but the gasket itself is effective and will seal the pipe ends.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A gasket for sealing the joint between aligned sections of pipe of different diameters, said gasket comprising a short circular member substantially frusto-conical in axial cross-section, said member having a base portion, two end portions extending radially inwardly from said base portions at the longitudinal ends thereof and a radially inwardly extending internal rib extending from said base portion of the gasket intermediate the end portions thereof, said end portions terminating inwardly in opposed, laterally extending lips, said gasket having two external, circumferential ribs positioned substantially at the longitudinal ends thereof extending radially outwardly from said member base portion, there being an external, substantially frustoconical transition section extending between said two ribs, said internal rib configured so as to provide a substantially frusto-conical, inboard transition section extending between the portion of the gasket adapted to receive the larger pipe and a portion of the gasket adapted to receive the smaller pipe while overlying the free ends of said pipes.

2. A gasket as in claim 1 wherein the lateral edges of said internal rib are of sufficient depth as to fully overlie and engage the end edges of the pipes to be joined.

3. A gasket as in claim 1 wherein there is provided a circumferential cylindrical surface on the lesser diameter side of the transition section, said cylindrical surface of lesser outer diameter than the outer diameter of the external rib next thereto.

4. A gasket as in claim 1 wherein there are provided two circumferential, substantially cylindrical surfaces, one on each side of the transition section, each of said cylindrical surfaces of lesser outer diameter than the outer diameter of the external rib next thereto.

5. A clamp-type coupling adapted to form a joint between pipes of different outer diameters, segmental coupling housings adapted to form a complete frusto-conical enclosure when applied to the ends of pipes to be joined, each segment having a substantially frusto-conical base portion with radially inwardly extending rims at the ends thereof, said rims forming with the configured interior of said base portion a gasket receiving and retaining channel, said rims having substantially the same radially inward extension, whereby to provide a larger diameter opening into one side of the complete enclosure and a lesser diameter opening into the other, the inwardmost extending portions of the end rims provided with key sections for engaging grooves formed in the outer surfaces of the pipe ends to be joined, and a gasket for sealing the joint between aligned sections of pipe of different diameters received within said enclosure, said gasket comprising a short circular substantially frusto-conical in axial cross-section, said member having a base portion, two end portions extending radially inwardly from said base portions of the longitudinal ends thereof and a radially inwardly extending internal rib extending from said base portion of said gasket intermediate the end portions thereof, said end portions terminating inwardly in opposed, laterally extending lips, said gasket having two external circumferential ribs positioned substantially at the longitudinal ends thereof extending radially outwardly from said member base portion, there being an external, substantially frusto-conical transition section extending between said two ribs, said internal rib configured so as to provide an inboard transition section between the portion of the gasket adapted to receive the larger pipe and the portion of the gasket adapted to receive the smaller pipe while overlying the free ends of said pipes, the configured interior of the gasket receiving and retaining channel substantially congruent to the outboard face and portions of the ends of the said gasket.

6. A device as in claim 5 wherein the gasket has two circumferential, substantially cylindrical surfaces, one on each side of the transition section, each of said cylindrical surfaces of lesser outer diameter than the outer diameter of the external rib next thereto.

7. A device as in claim 5 wherein the length of said laterally extending lips of said gasket is sufficient to cover the end peripheral surfaces of the pipes past said grooves therein.

8. A device as in claim 5 wherein the lateral edges of the gasket internal rib are of sufficient radial depth as to fully overlie and engage the end edges of the pipes to be joined.

9. A gasket as in claim 5 wherein there is provided a circumferential cylindrical surface on the lesser diameter side of the transition section, said cylindrical surface of lesser outer diameter than the outer diameter of the external rib next thereto.

10. A reducing type connection between pipes of differing outer diameter which comprises, in combination, a pair of pipe sections positioned end to end and in axial alignment with one another, one section having a greater outer diameter than the other the adjacent ends of said pipe sections spaced apart from one another a short distance, the outer peripheral surfaces of the adjacent ends of said pipe sections having circumferential grooves formed therein adjacent to, but spaced from the adjacent ends thereof, whereby to leave gasketengaging surfaces on the exterior peripheries of said pipe sections between said grooves and the adjacent ends thereof, a clamp-type coupling forming a joint between the adjacent ends of said two pipe sections, said clamp-type coupling comprising a pair of segmental coupling housings adapted to form a complete, essentially frusto-conical enclosure when applied to the ends of the pipes to be joined, each segment having a substantially frusto-conical base portion with radially inwardly extending rims at the end thereof, said rims forming with the configured interior of said base portion a gasket receiving and retaining channel, said rims having substantially the same radially inward extension, whereby to provide a larger diameter opening into one side of the complete enclosure receiving the larger outer diameter pipe end and a lesser diameter opening into the other enclosure side receiving the lesser outer diameter pipe end, the inwardmost extending portions of the end rims provided with key sections engaging the grooves formed in the outer surfaces of the pipe ends, a pressure-responsive gasket sealing the joint between said aligned, adjacent sections of pipe, said gasket comprising a short circular member substantially frusto-conical in axial cross-section, said member having a base portion, two end portions extending radially inwardly from said base portions at the longitudinal ends thereof and a radially inwardly extending internal rib extending from said base portion of the gasket intermediate the end portions thereof, said end portions terminating inwardly in opposed, laterally extending lips, the said lips of said end portions circumferentially abutting against and in contact with the outer surfaces of the pipe ends between said grooves, and said internal rib positioned between the pipe ends on the sides thereof, said gasket having two external circumferential ribs positioned substantially at the longitudinal ends thereof extending radially outwardly from said member base portion there being an external, substantially frusto-conical transition section extending between said two ribs, said internal rib configured so as to provide an inboard transition section between the interiors of the two pipes, the configured interior of the gasket receiving and retaining channel substantially congruent to the outboard face of the gasket.

11. A device as in claim 10 wherein there are provided two circumferential, substantially cylindrical surfaces, one on each side of the transition section, each of said cylindrical surfaces of lesser outer diameter than the outer diameter of the external rib next thereto.

12. A connection as in claim 10 wherein the length of the laterally extending gasket lips is sufficient to cover the end peripheral surfaces of said pipes past said grooves therein.

13. A connection as in claim 10 wherein the lateral edges of the gasket internal rib are of sufficient radial depth as to fully overlie the ends of edges of the pipes to be joined.

14. A gasket as in claim 10 wherein there is provided a circumferential cylindrical surface on the lesser diameter side of the transition section, said cylindrical surface of lesser outer diameter than the outer diameter of the external rib next thereto.

15. A gasket for sealing the joint between aligned sections of pipe of different diameters, said gasket comprising a short circular member substantially frusto-conical in axial cross-section, said member having a base portion and two end portions extending redially inwardly from said base portions at the longitudinal ends thereof, said end portions terminating inwardly in opposed, laterally extending lips, said gasket having two external, circumferential ribs positioned substantially at the longitudinal ends thereof extending radially outwardly from said member base portion, there being an external, substantially frusto-conical transition section extending between said two ribs, and a circumferential, substantially cylindrical surface on the lesser diameter side of said transition section, said cylindrical surface of lesser outer diameter than the outer diameter of the external rib next thereto.

16. A gasket as in claim 15 wherein the lateral edges of said internal rib are of sufficient depth as to fully overlie and engage the end edges of the pipes to be joined.

17. A clamp-type coupling adapted to form joint between pipes of different outer diameters, segmental coupling housings adapted to form a complete frusto-conical enclosure when applied to the ends of pipes to be joined, each segment having a substantially frusto-conical base portion with redially inwardly extending rims at the ends thereof, said rims forming with the configured interior of said base portion a gasket receiving and retaining channel, said rims having substantially the same radially inward extension, whereby to provide a larger diameter opening into one side of the complete enclosure and a lesser diameter opening into the other, the inwardmost extending portions of the end rims provided with key sections for engaging grooves formed in the outer surfaces of the pipe ends to be joined, and a gasket for sealing the joint between aligned sections of pipe of different diameters received within said enclosure, said gasket comprising a short circular substantially frusto-conical in axial cross-section, said member having a base portion and two end portions extending radially inwardly from said base portions of the longitudinal ends thereof, said end portions terminating inwardly in opposed, laterally extending lips, said gasket having two external circumferential ribs positioned substantially at the longitudinal ends thereof extending radially outwardly from said member base portion, there being an external, substantially frusto-conical transition section extending between said two ribs, and a circumferential, substantially cylindrical surface on the lesser diameter side of said transition section, said cylindrical surface of lesser outer diameter than the outer diameter of the external rib next thereto, the configured interior of the gasket receiving and retaining channel substantially congruent to the outboard face and portions of the ends of the said gasket.

18. A device as in claim 17 wherein the length of said laterally extending lips of said gasket is sufficient to cover the end peripheral surfaces of the pipes past said grooves therein.

19. A reducing type connection between pipes of differing outer diameter which comprises, in combination, a pair of pipe sections positioned end to end and in axial alignment with one another, one section having a greater outer diameter than the other, the adjacent ends of said pipe sections spaced apart from one another a short distance, the outer peripheral surfaces of the adjacent ends of said pipe sections having circumferential grooves formed therein adjacent to, but spaced from the adjacent ends thereof, whereby to leave gasket-engaging surfaces on the exterior peripheries of said pipe sections between said grooves and the adjacent ends thereof, a clamp-type coupling forming a joint between the adjacent ends of said two pipe sections, said clamp-type coupling comprising a pair of segmental coupling housings adapted to form a complete; essentially frusto-conical enclosure when applied to the ends of the pipes to be joined, each segment having a substantially frusto-conical base portion with radially inwardly extending rims at the end thereof, said rims forming with the configured interior of said base portion a gasket receiving and retaining channel, said rims having substantially the same radially inward extension, whereby to provide a larger diameter opening into one side of the complete enclosure receiving the larger outer diameter pipe end and a lesser diameter opening into the other enclosure side receiving the lesser outer diameter pipe end, the inwardmost extending portions of the end rims provided with key sections engaging the grooves formed in the outer surfaces of the pipe ends, a pressure-responsive gasket sealing the joint between said aligned, adjacent sections of pipe, said gasket comprising a short circular member substantially frusto-conical in axial cross-section, said member having a base portion and two end portions extending radially inwardly from said base portions at the longitudinal ends thereof said end portions terminating inwardly in opposed, laterally extending lips, the said lips of said end portions circumferentially abutting against and in contact with the outer surfaces of the pipe ends between said grooves, said gasket having two external circumferential ribs positioned substantially at the longitudinal ends thereof extending radially outwardly from said member base portion there being an external, substantially frusto-conical transition section extending between said two ribs, and a circumferential, substantially cylindrical surface on the lesser diameter side of the transition section, said cylindrical surface of lesser outer diameter than the outer diameter of the external rib next thereto, the configured interior of the gasket receiving and retaining channel substantially congruent to the outboard face of the gasket.

20. A connection as in claim 19 wherein the length of the laterally extending gasket lips is sufficient to cover the end peripheral surfaces of said pipes past said grooves therein.

* * * * *